(12) United States Patent
Pappalardo et al.

(10) Patent No.: US 6,842,744 B2
(45) Date of Patent: Jan. 11, 2005

(54) CODING AND MEMORIZING METHOD FOR FUZZY LOGIC MEMBERSHIP FUNCTIONS AND CORRESPONDING METHOD AND CIRCUIT ARCHITECTURE FOR CALCULATING THE MEMBERSHIP DEGREE

(75) Inventors: Francesco Pappalardo, Paternó (IT); Biagio Giacalone, Trapani (IT); Carmelo Marcello Palano, San Nicolò Acicatena (IT); Claudio Luzzi, Acicastello (IT); Francesca Grande, Syracuse (IT)

(73) Assignee: STMicroelectronics S.r.l., Agrate Brianza (IT)

(*) Notice: Subject to any disclaimer, the term of this patent is extended or adjusted under 35 U.S.C. 154(b) by 380 days.

(21) Appl. No.: 09/969,519

(22) Filed: Oct. 1, 2001

(65) Prior Publication Data

US 2002/0099673 A1 Jul. 25, 2002

(30) Foreign Application Priority Data

Oct. 2, 2000 (EP) .............................. 00830647

(51) Int. Cl.$^7$ .............................. G06F 15/18; G06F 9/44
(52) U.S. Cl. .............................. 706/8; 706/52
(58) Field of Search ....................... 706/8, 52

(56) References Cited

U.S. PATENT DOCUMENTS

| | | | | |
|---|---|---|---|---|
| 5,280,566 A | * | 1/1994 | Nakamura | 706/52 |
| 5,390,180 A | * | 2/1995 | Reilly | 370/476 |
| 6,075,338 A | * | 6/2000 | Mazza et al. | 318/803 |
| 6,347,153 B1 | * | 2/2002 | Triplett et al. | 382/224 |

FOREIGN PATENT DOCUMENTS

| | | |
|---|---|---|
| EP | 0 628 903 A1 | 12/1994 |
| JP | 2-68630 | 3/1990 |

OTHER PUBLICATIONS

Karayiannis et al. "Fuzzy Vector guantization Algorithms", Proceedings of the 3rd IEEE Conference on Computational Intelligence, Jun. 1994.*
Uehara, K. et al., "Fuzzy Inference Based on Families of α–Level Sets," *IEEE Transactions on Fuzzy Systems*, 1(2):111–124, 1993.
Catania, V. et al., "Design Issues of an Asynchronous Parallel Fuzzy Processor," in *Proceedings of the International Conference on Fuzzy Systems*, New York, Mar. 20, 1995, pp. 1205–1212.

* cited by examiner

*Primary Examiner*—George Davis
(74) *Attorney, Agent, or Firm*—Lisa K. Jorgenson; E. Russell Tarleton; Seed IP Law Group PLLC

(57) ABSTRACT

A codifying and storing method for membership functions representing a membership degree of fuzzy variables defined within a universe of discourse which is discretized into a finite number of points is provided. The membership functions are quantized into a finite number of levels corresponding to a finite number of membership degrees and are stored by means of a characteristic value of each sub-set of values of fuzzy variables having for their image the same value of the membership degree corresponding to one of said levels. Also provided is a method for calculating the value of the membership degree of a fuzzy variable defined within a universe of discourse discretized into a finite number of points with reference to a membership function thereof, as well as to a circuit for calculating the membership degree of a fuzzy variable with reference to a membership function thereof.

22 Claims, 5 Drawing Sheets

CODING AND MEMORIZING METHOD FOR FUZZY LOGIC MEMBERSHIP FUNCTIONS AND CORRESPONDING METHOD AND CIRCUIT ARCHITECTURE FOR CALCULATING THE MEMBERSHIP DEGREE

BACKGROUND OF THE INVENTION

1. Field of the Invention

This invention relates to a codifying and storing method for fuzzy membership functions, the membership degree, as well as to a corresponding circuit for calculating the membership degree.

Specifically, the invention relates to a codifying and storing method for membership functions representing a membership degree of fuzzy variables defined within a universe of discourse which is discretized into a finite number of points.

The invention also relates to a method for calculating the value of the membership degree of a fuzzy variable defined within a universe of discourse which is discretized into a finite number of points with reference to a membership function thereof.

The invention further relates to a circuit for calculating the membership degree of a fuzzy variable within a universe of discourse which is discretized into a finite number of points with reference to a membership function thereof.

2. Description of the Related Art

As is well known, a membership function (hereinafter also MF) is a single-variable function which, therefore, can be represented on a two-dimensional graph.

In particular, such a function represents the membership degree, MF(x), of a fuzzy variable x, and can be reproduced on a graph having the fuzzy variable x plotted on one axis and the respective membership degree, commonly designated $\alpha$, plotted on the other axis.

The codifying of the membership functions MF has been the subject of extensive investigations, due to the fact that it takes up a considerable amount of memory when the membership functions MF need to be stored, for instance, in a possible calculating structure.

In particular, with a digital calculating structure, a necessary simplification is that of discretizing the membership functions MF as integer values of the fuzzy variable x in a so-called "universe of discourse" (U.d.D.). Each membership function MF is then defined by 0 to $2^n-1$ points, i.e., discretized into n bits.

Several techniques for storing membership functions MF are known.

A first known storing method uses a table for storing up, point by point, the value of the membership function MF, meaning that, for each discretized value of the fuzzy variable x, a corresponding membership degree $\alpha$ is stored.

This first known method has a major advantage in that membership functions MF of any forms can be stored, and that the membership degrees $\alpha$ can be extracted at a fast rate starting from a given fuzzy variable x.

However, this approach has an important drawback in that the punctual storing of all the membership functions MF takes up a considerable amount of memory.

Also known is to reduce the set of representable membership functions MF down to a sub-set which contains only certain geometric figures and, within this constraint, to use parameters for storing the membership functions MF. In particular, based on these parameters, the membership degree $\alpha$ of a membership function MF can be calculated as a function of the fuzzy variable x, thereby saving much memory area.

There is also a dramatic decrease in the membership functions MF that can be represented with any accuracy, that is readily reduced to the allowable sub-set of geometric figures.

This prior codifying and storing method for membership functions MF is used, for example, in U.S. Pat. No. 5,875,438, filed on Feb. 23, 1999.

Furthermore, this type of an approach requires complicated dedicated hardware for calculating the membership degree $\alpha$ from a given fuzzy variable x, and takes a long time to calculate the corresponding membership degrees $\alpha$.

The technical problem underlying this invention is to provide a storing method for membership functions MF which would apply to functions of any forms, while occupying but a small amount of memory area, so as to overcome the limitations of known storing methods.

BRIEF SUMMARY OF THE INVENTION

The resolutive idea to the technical problem is achieved, according to the invention, by splitting the membership functions MF into non-decreasing monotone or non-increasing monotone sections, and storing the membership function MF into a table whose address indicates the membership degree $\alpha$. Thus, stored in the table will be maximum values, as well as minimum values, of a sub-set of fuzzy variables x having for their image the same membership degree $\alpha$.

In accordance with one embodiment of the invention, a method for codifying and storing member ship functions MF is provided, the membership functions representing a membership degree of fuzzy variables defined within a universe of discourse that is discretized into a finite number of points. The method includes quantizing the membership functions into a finite number of levels corresponding to a finite number of membership degrees, and storing the quantized membership functions according to a characteristic value of each sub-set of values of fuzzy variables that have for their image the value of the membership degree corresponding to one of the levels.

In accordance with another embodiment of the invention, a method for calculating the value of the membership degree of a fuzzy variable defined within a universe of discourse discretized into a finite number of points with reference to a membership function thereof is provided. This method comprises quantizing the membership function into a finite number of levels corresponding to a finite number of membership degrees, and storing the quantized membership function according to a characteristic value of each sub-set of values of fuzzy variables having for their image the same value of the membership degree corresponding to one of the levels. The method further includes reading sequentially from a memory containing data about the membership function until a value contained in the memory is met that corresponds to the first value equal to or greater than the value of an input fuzzy variable, the location of the value in the memory corresponding to the value of the membership degree sought.

In accordance with another embodiment of the invention, a circuit for calculating the membership degree of a fuzzy variable within a universe of discourse that is discretized into a finite number of points with reference to a membership function thereof is provided. This circuit includes a counter supplying a count signal; a table of a memory containing characteristic values of each sub-set of values of fuzzy variables having for their image the same value of the membership degree and being connected to an input of the counter; a comparator connected to an input of the counter and connected to the table, the comparator configured to supply an end-of-search signal to the counter; an adder block connected to an input of the counter to receive the count signal, and supplying a result; and a calculation block connected to an input of the adder block and supplying at an output a value of the membership degree or a negated value of the membership degree according to a polarity signal input into the calculation block.

The features and advantages of the methods and the circuit according to the invention will be apparent from the following description of embodiments thereof, given by way of examples and not of limitation with reference to the accompanying drawings.

DETAILED DESCRIPTION OF THE INVENTION

Figure 1:
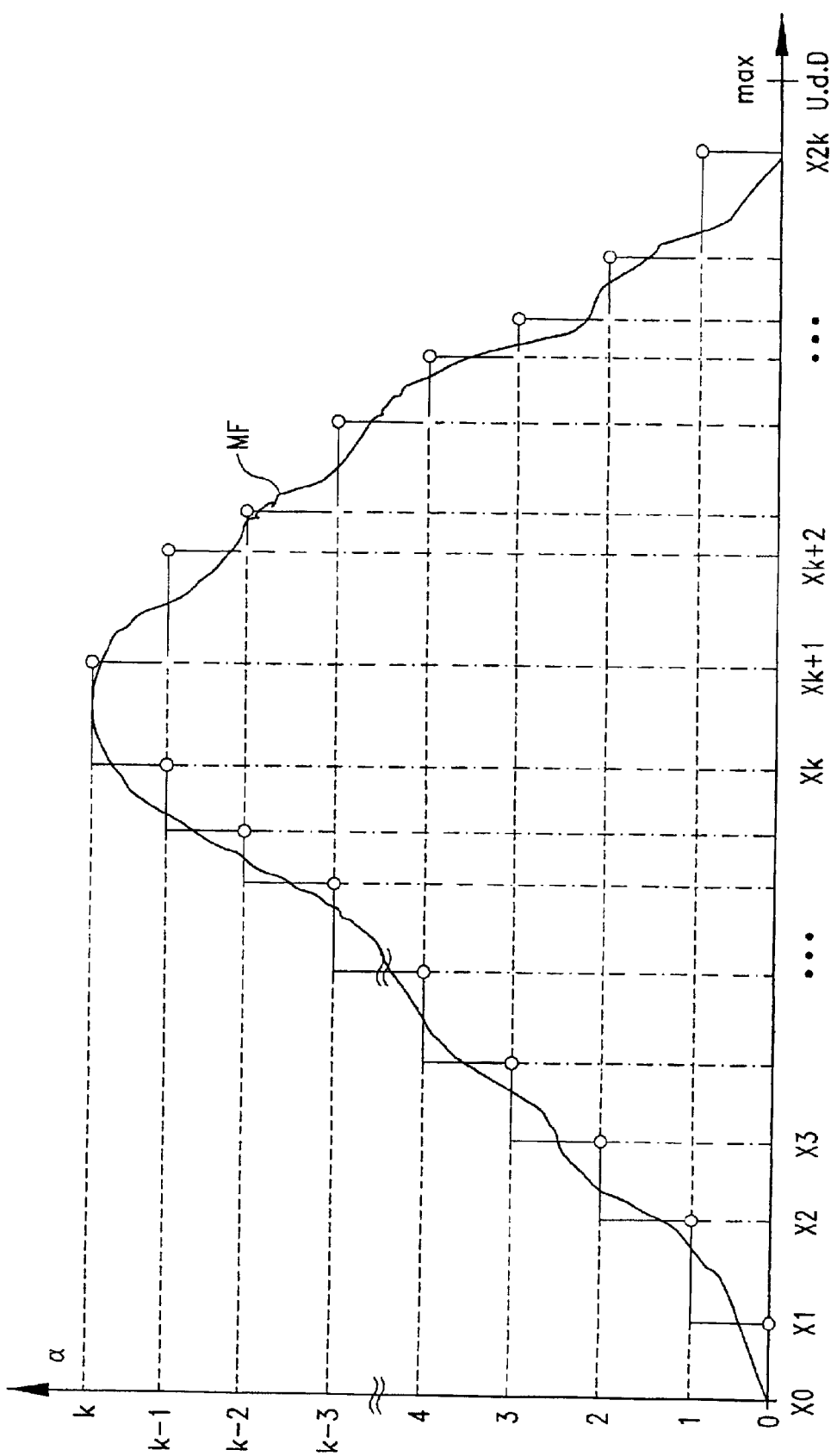
FIG. 1 shows schematically a membership function MF as discretized and quantized for storing according to a first storing method according to the invention.

The codifying and storing method for membership functions MF in accordance with the invention proceeds from the observation that the set of possible values for a fuzzy variable x is generally much larger than the set of possible values of the membership degree $\alpha$ for a membership function MF as calculated starting from said set of values for the fuzzy variable x.

It should be considered in this respect, that the set of values of the fuzzy variable x represents the universe of discourse (U.d.D.) of the fuzzy variable, i.e., in digital notation, a value of 0 to ($2^n-1$), where n is the number of bits representing the fuzzy variable x. Also, the values of the membership degree $\alpha$ have, in digital notation, a maximum value which is always much smaller than the maximum value of the U.d.D. Accordingly, the values of the membership degree $\alpha$ can be represented by few bits.

Thus, when the set of values which represent the universe of discourse U.d.D. and consist of the set of possible values for the fuzzy variable x, and the set of possible values of the membership degree for the membership function MF are considered, it can be stated that many of the values in the U.d.D. set have the same projection or $\alpha$ value as the membership degree.

Based on this consideration, the storing method according to the invention provides for storing the values of the membership degree $\alpha$ of a membership function MF into a table whose address indicates the membership degree $\alpha$. Stored in this table, for each address value, will be a maximum value, as well as a minimum value, of a sub-set of values of fuzzy variables x having for their image the same value of the membership degree $\alpha$.

In particular, let's assume for simplicity that membership functions MF are represented which have only one maximum, i.e., which can be split in two parts, a first part being a non-decreasing monotone part and the second a non-increasing monotone part (or the converse if they have only one minimum). Advantageously according to the invention, the membership degree $\alpha$, e.g., for the non-decreasing monotone part, is used as the address of a table containing the maximum or minimum values of the sub-set which represents all the values of the fuzzy variable x that have for their image this value $\alpha$ used as a row address. For the non-increasing monotone part, the address value is related to the value $\alpha$ as $\alpha=\text{ADD}-2^p+1$, where p is the number of bits used to represent the membership degree $\alpha$.

Briefly, the membership degree $\alpha$ is given by the following relation:

$\alpha=\text{ADD}$ if $\text{ADD} \leq 2p-1$, and $\alpha=\text{ADD}-2p+1$ if $\text{ADD} > 2p-1$.

Thus, the value of the membership degree $\alpha$ can be calculated starting from the row address ADD of the table.

The well recognized fact should be emphasized here that any functions can be represented by a succession of functions having only one maximum and/or one minimum. Also, it is well recognized that a single minimum function can be represented by its mirror image, i.e., a single maximum function, by calculating a negated value of $\alpha$.

The storing method according to the invention has therefore an advantage in that it is a comprehensive method for application to membership functions MF of any forms.

For convenience of explanation and based on the above geometrical and mathematical considerations, reference will be made hereinafter to the codifying of membership functions MF having one maximum, the applicability to single minimum functions and more complex functions resulting from combinations of single maximum and single minimum functions being self-evident.

Furthermore, the universe of discourse, U.d.D., will be represented hereinafter by n bits and the membership degree by p bits. Given $k=2^p-1$, the invention advantageously uses a memory with (2k+1) rows of n bits to represent a membership function MF.

Advantageously according to the invention, the membership function MF can be stored using two different methods.

Method 1

The membership function MF is split into a first non-decreasing monotone part and a second non-increasing monotone part, as shown schematically in FIG. 1. Furthermore, the membership function MF is quantized so as to comprise a series of sub-sets corresponding graphically to horizontal segments each of the same value $\alpha$, said sub-set of values for the fuzzy variable x corresponding to the value $\alpha$.

Starting with the first non-decreasing monotone part, i.e., from the 0 point, those sub-sets of values of the fuzzy variable x which give the same value $\alpha$ as a result are identified, and their maximum values considered.

Let's assume for the first non-decreasing monotone part:

x0 to be the maximum value of the set of values [0,x0] of the fuzzy variable x whereby $\alpha=0$;

$x_1$ to be the maximum value of the set of values [$x_0,x_1$] of x whereby $\alpha=1$;

up to $x_k$, which is the maximum value of the set of values $[x_{(k-1)}, x_k]$ of x whereby $\alpha=k$;

and, for the second non-increasing monotone part:

$x_{(k+1)}$ to be the maximum value of the set of values $[x_k, x_{(k+1)}]$ of the fuzzy variable x whereby $\alpha=(k-1)$;

$x_{(k+2)}$ to be the maximum value of the set of values $[x_{(k+1)}, x_{(k+2)}]$ of x whereby $\alpha=(k-2)$;

up to $x_{2k}$, which is the maximum value of the set of values $[x_{(2k-1)}, x_{2k}]$ of x whereby $F(x)=(k-k)=0$.

The last value, $x_{2k}$, is always coincident with the maximum value of the universe of discourse, U.d.D., i.e., $(2^n-1)$.

Thus, the universe of discourse, U.d.D., is split into contiguous ranges $([x_{(i-1)}, x_i])$, each having a single value of the membership degree, $MF(x_i)$—where $x_i$ is the maximum value of the fuzzy variable x in that range-associated therewith.

At this stage, the membership function MF can be codified and stored into a memory MMF of the membership functions MF such that $x_0$ will correspond to address 0, $x_1$ will correspond to address 1, and so on to $x_k$, corresponding to address k.

Figure 2:
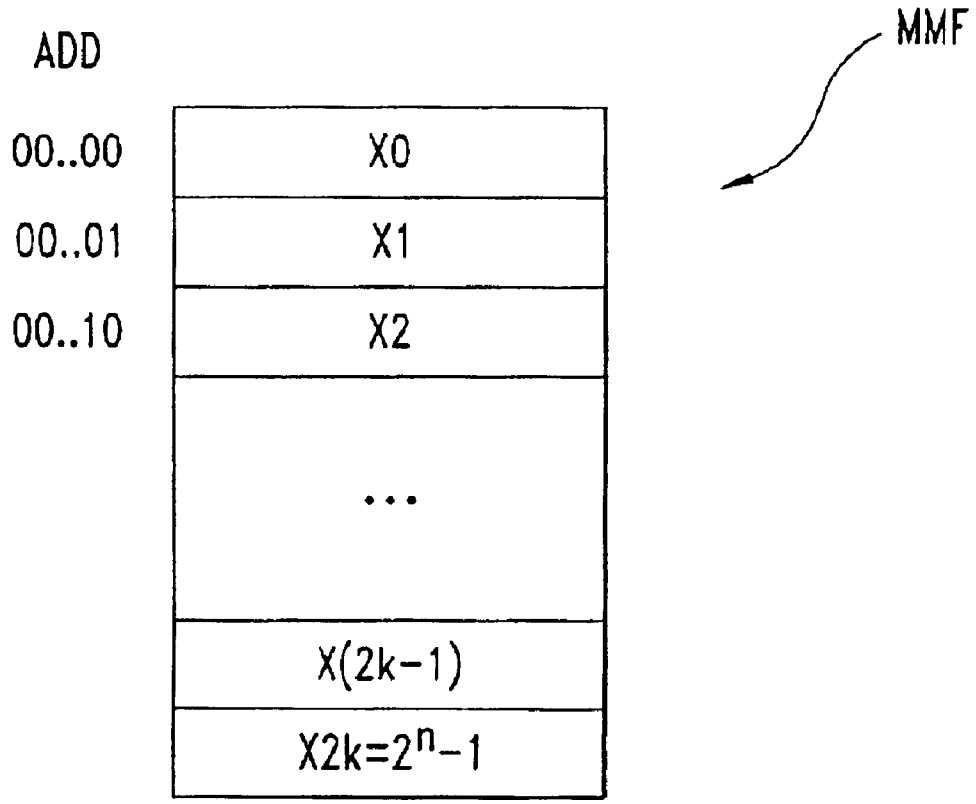
FIG. 2 shows schematically a memory table for storing the membership function MF of FIG. 1.

Similarly, $x_{(k+1)}$ is made to correspond to address k+1, $x_{(k+2)}$ correspond to k+2, and so on to $x_{2k}=(2^n+1)$, corresponding to address 2k, as shown schematically in FIG. 2.

Actually, it can be avoided to store the last value $x_{2k}$ because its value is known beforehand. However, storing this value is useful to calculate it from the value n according to the chosen calculation algorithm.

This choice stays with the designer of the calculation circuit, and presently of consequence is just the fact that by storing $x_{2k}$, the sequence of sets of x which have the same image in $\alpha$ can be terminated. However, this may be unnecessary to the calculation algorithm, and $x_{(2k-1)}$ may be taken as the terminating value to save one location in the memory MMF.

Method 2

Figure 3:
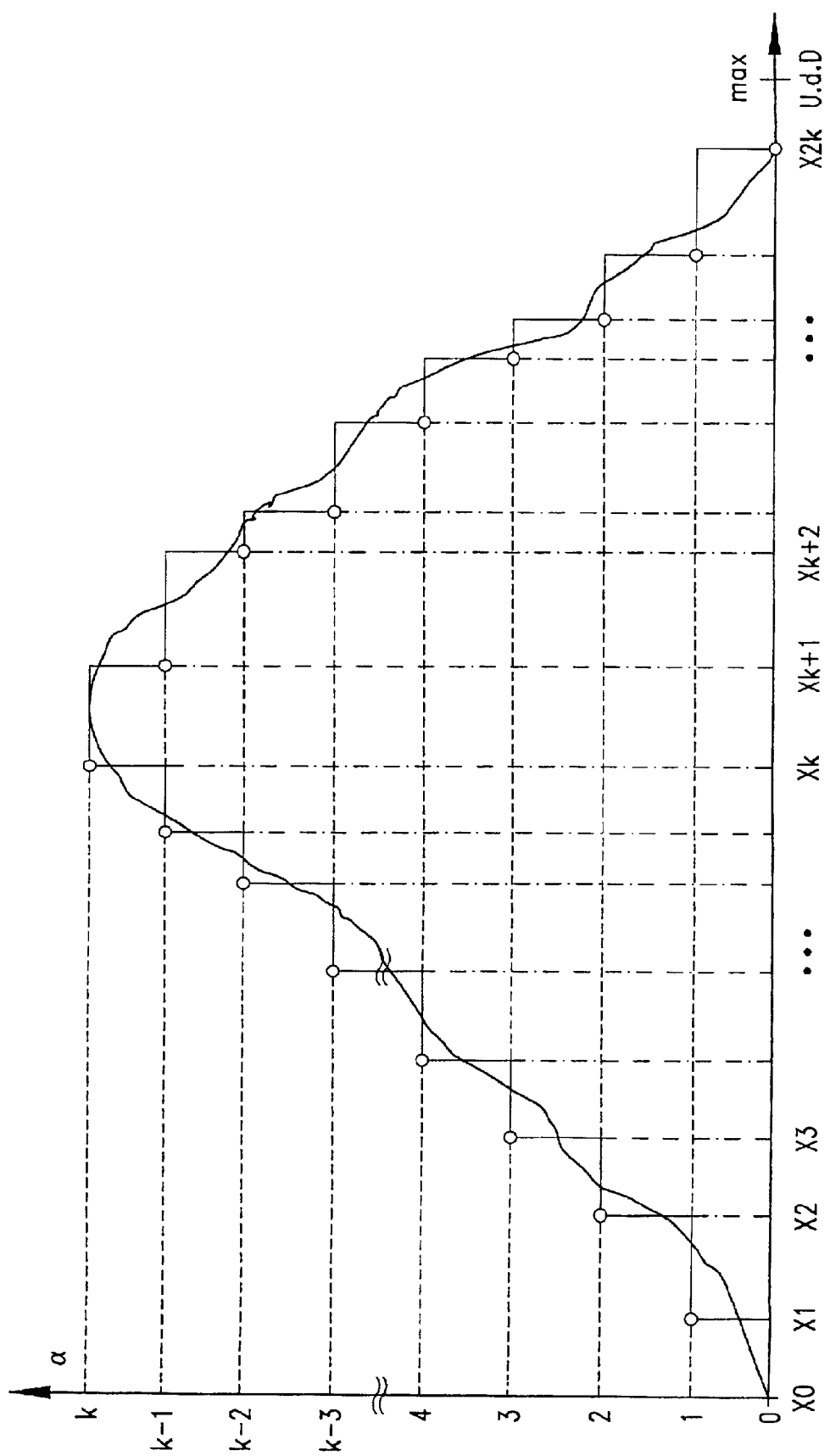
FIG. 3 shows schematically a membership function MF as discretized and quantized for storing according to a second storing method according to the invention.
Figure 4:
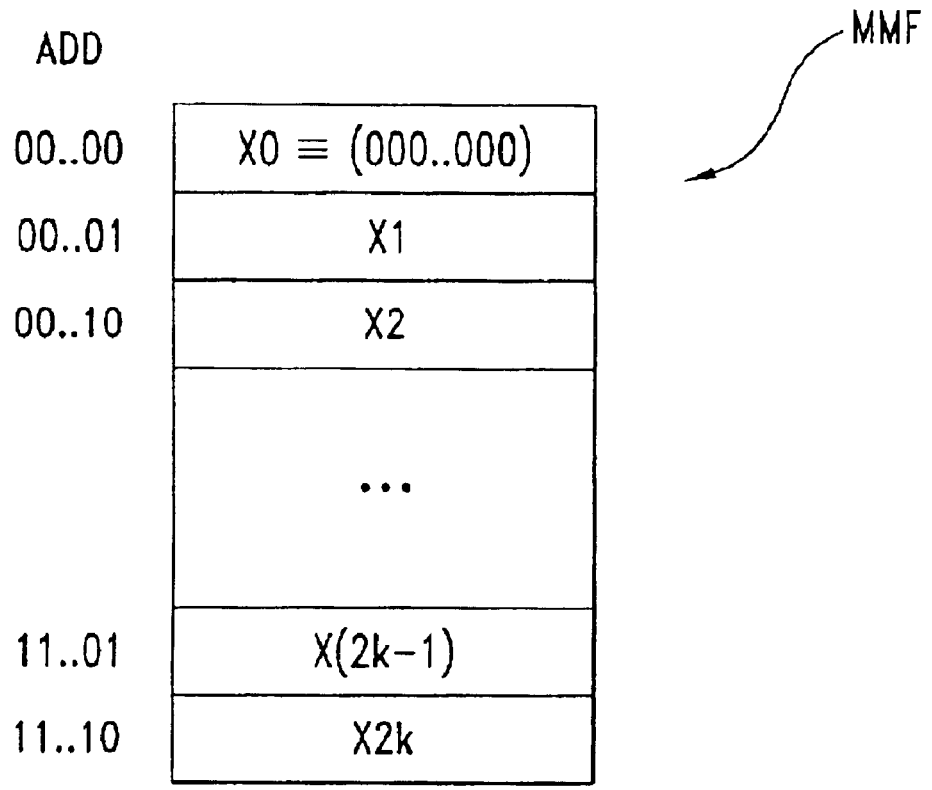
FIG. 4 shows schematically a memory table for storing the membership function MF of FIG. 3.

This is similar to Method 1, except that the minimum value in the set of values of x giving the same value of $\alpha$ is stored into the table instead of the maximum value in the set of values of x giving the same value of $\alpha$, as shown schematically in FIGS. 3 and 4.

Whereas known beforehand in Method 1 is the last value, the first value is here known beforehand because it is coincident with the lowest value of U.d.D., usually 0. The storing of this minimum value into the table can also be avoided in order to simplify the calculation algorithm.

Advantageously according to the invention, a membership function MF having a single minimum can be dealt with in two ways:

1) by applying the same technique, i.e., storing either the value of the minimum or the value of the maximum and considering, in the calculation circuit, the non-increasing monotone part first and then the non-decreasing monotone part;

2) by taking into consideration the complementary function with respect to the maximum value of the membership degree, i.e., with $\alpha$ being given, negated $\alpha$ is taken so that:

Max_truth_degree=$\alpha$+negated $\alpha$, for any value of x;

and the calculation for the membership degree, $\alpha$, and calculation for the corresponding membership degree, negated $\alpha$, are reversed, and vice versa.

In addition, the above method forming the subject matter of this patent application can be readily extended to membership functions MF having more than one maximum and one minimum, by just splitting them into several non-decreasing and non-increasing monotone sections, and storing the sections thus found in succession.

This technique for codifying and storing the membership functions MF may also be applied to three-dimensional and multi-dimensional functions, on the grounds of the same geometrical and analytical considerations as made hereinabove in connection with two-dimensional functions.

A comparative numerical example will now be given of the codifying and storing method for membership functions MF according to the invention and known methods.

In this example, p=4 (bits for storing the maximum membership degree) and n=8 (bits for storing the maximum value of the universe of discourse, U.d.D.) will be assumed, i.e., $k=2^p-1=15$ and $2^n-1=255$ as the maximum value of U.d.D.

The first method, previously described as representative of the state of the art—i.e., the storing method wherein a table is used to store up, point by point, the value of the membership function MF—exhibits the following features:

it requires a large capacity memory for the membership functions MF, in particular one having 256 rows and a 4-bit word=256*4=1024 bits;

it requires a short calculation time for the membership degrees, $\alpha$;

it enables any membership functions MF to be represented.

Similarly, the second method, previously described as representing the state of the art and wherein parameters are used for storing up the membership functions MF, exhibits the following features:

it only enables triangular functions to be stored, the storing being effected using a central apex and the right and left distances;

it requires a 3*8=24 bits memory for the membership functions MF;

it involves highly complex hardware for computing membership degrees, $\alpha$—since it would need at least a multiplier, an adder and a divider—and consequently a long calculation time for $\alpha$.

Advantageously according to the invention, the codifying and storing method described hereinabove exhibits the following features:

it requires only 31 8-bit memory rows, i.e., 31*8=248 bits (less than one quarter the memory of Method 1);

it enables membership functions MF of any forms to be stored, although limited to functions having one maximum or one minimum.

The advantages of the method according to the invention, as above explained, grow in importance with the n/p ratio associated with the parameters to be stored of the values of the membership degrees, $\alpha$, and the fuzzy variables x.

Based on the above codifying and storing method, a method for calculating the value of the membership degree, $\alpha$, will now be described which involves simple circuitry and can be implemented by hardware of a reduced size.

As stated above, the size of the memory MMF for the membership functions MF is dependent on the size of the universe of discourse, U.d.D., and the maximum possible value of the membership degrees.

Assume the universe of discourse, U.d.D., to be represented by means of n bits and the membership degree by means of p bits. Given that $k=2^p-1$, to represent a membership function MF by the codifying and storing method for according to the invention, a (2k+1) rows memory is used, each row having n bits.

Advantageously according to the invention, it is provided a method for calculating the membership degree $\alpha$ of a fuzzy variable relative to its membership function MF, the membership function MF being coded and stored up, as previously described, into a memory MMF.

In particular, the calculation method according to the invention is of a sequential type and provides for reading sequentially from the memory MMF until a value $x_m$ contained in the memory MMF is found which corresponds to the first value equal to or greater than the value of an input fuzzy variable $x_{ing}$, the location of said value $x_m$ in the memory MMF being the value of the membership degree α sought.

Advantageously according to the invention, the calculation method further comprises calculating a negated value α' of said value α as a function of a polarity signal POL and according to the following scheme:

polarity of 0 (POL=0)=>calculation of value α polarity of 1 (POL=1)=>calculation of negated value α'.

Figure 5:
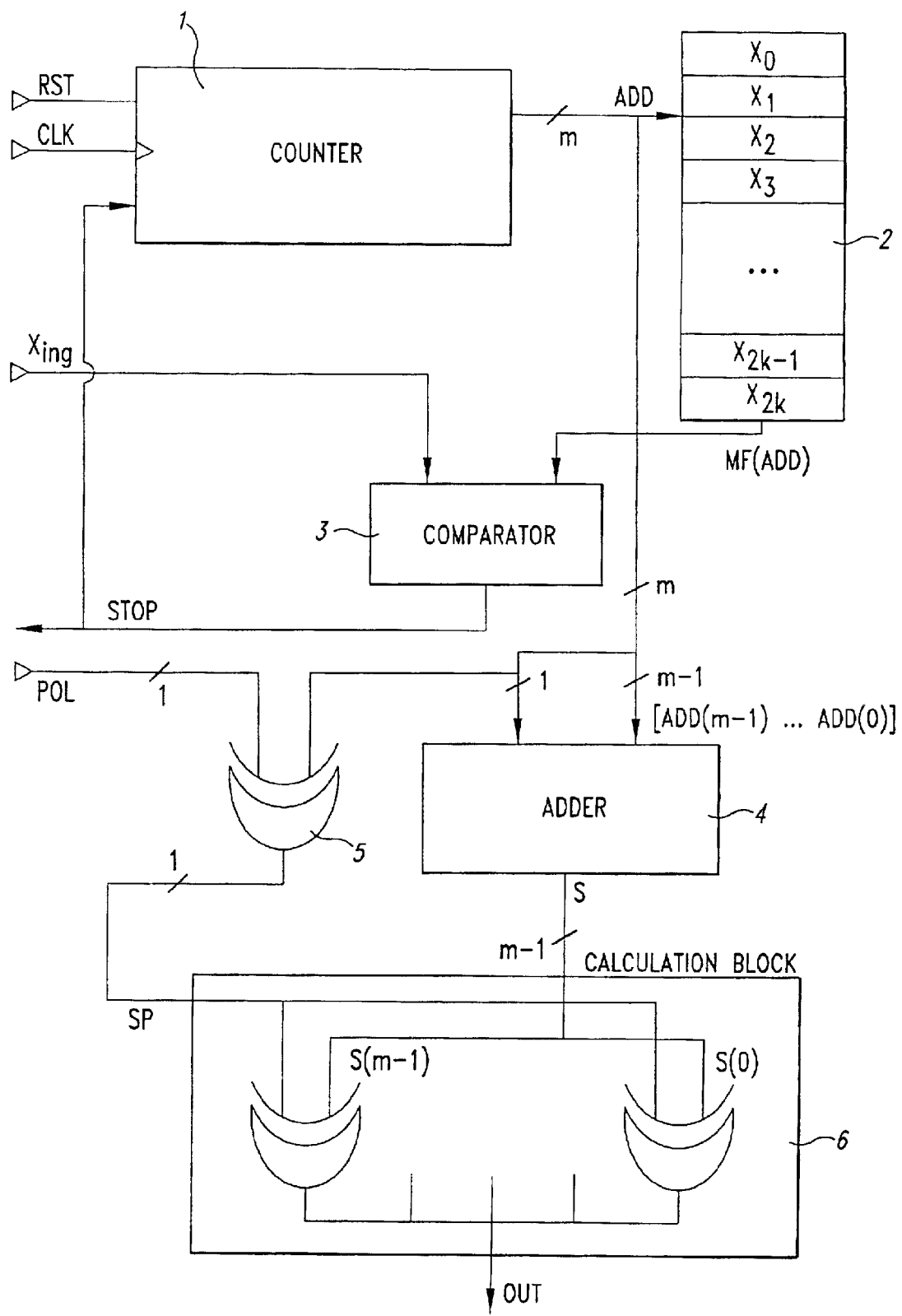
FIG. 5 shows schematically an architecture implementing the calculation method according to the invention in connection with the first storing method of FIG. 1.

Referring in particular to FIG. 5, a calculation circuit 10 implementing the calculation method of the invention will now be described.

In particular, the calculation circuit 10 will calculate, from the input fuzzy variable $x_{ing}$, a value α corresponding to the membership degree of the input fuzzy variable $x_{ing}$.

The calculation circuit 10 comprises essentially a counter 1 connected to a table 2 of the memory MMF which contains the membership functions MF stored in accordance with the codifying and storing method 1 of the invention. In particular, storing the maximum values of the ranges $[x_{i-1}, x_i]$ will be considered.

The counter 1 is input a clock signal CLK, a reset signal RST and an end-of-search signal STOP, and outputs a count signal ADD.

The calculation circuit 10 further comprises a comparator 3 which is input the value of the input fuzzy variable $x_{ing}$ and a value MF(ADD)=$x_m$ contained in the table 2 corresponding to the row ADD, and outputs the end-of-search signal STOP sent to the counter 1 input.

The count signal ADD is an m-bit signal, where m=p+1, and is sent dividedly to first A and second B inputs of an adder block 4. In particular, the bits m−1 to 0 of the count signal ADD are delivered to said second input B of the adder block 4, and the m-th bit of the count signal ADD, corresponding to the most significant bit (MSB) of the polarity signal POL, is delivered to the first input A of the adder block 4.

Moreover, in order to implement the above polarity rule, the MSB of the count signal ADD is also delivered to one input of a XOR logic gate 5 which receives the polarity signal POL on another input and outputs a polarity flag SP, in turn input to a plurality of (m−1) XOR logic gates PLm−1, . . . , PL0 contained in another calculation block 6.

This calculation block 6 is input a result S from the adder block 4, and issues on an output OUT either the value α or its negation α', according to the value of the polarity flag SP from the XOR gate 5.

The operation of the calculation circuit 10 according to the invention will now be described. The reset signal RST initiates the step for calculating the value α or its negation α' by starting the counter 1, which will begin to generate and issue the count signal ADD to the table 2 of the memory MMF wherein the maximum values of the ranges $[x_{i-1}, x_i]$, corresponding to those sets of the fuzzy variable x which have same value α, are stored.

The comparator 3 checks that the value $x_{ing}$ is equal to or greater than the value contained at the address ADD in the memory, i.e., that $x_{ing} \leq$ MMF(ADD), and outputs a value 0 to stop the counter 1.

At this stage, the value ADD allows the desired information, i.e., the value α or its negation α', to be calculated by the following rule:

if input $x_{ing}$ is in the non-decreasing monotone part of the membership function MF, the count signal ADD coincides with the value α;

if input $x_{ing}$ is in the non-increasing monotone part of the membership function MF, the value (ADD−$2^p$+1) coincides with the negated value α'.

It should be noted that the negated value α' is conceptually defined as the maximum value of the membership degree minus the value α, that is:

α'=(maximum membership degree)−α.

In the instance of the binary notation, and assuming the maximum value of the membership degree to be coincident with the highest value that can be represented with the available bits (a condition which is always used in order to optimize fuzzy systems), the negated value α' can be calculated by simply negating, bit by bit, the value α, and conversely, the value α can be calculated by inverting the negated value α' bit by bit.

The adder block 4 then adds together the bits received at the inputs A and B, to directly output the value α if the MSB of the value ADD is a 0, and the negated value α' if the MSB of the value ADD is a 1.

If the MSB of the count signal ADD is a 0, the input fuzzy variable $x_{ing}$ is in the non-decreasing monotone part of the membership function MF and the sum of the bits received at the inputs A and B of the adder block 4 is indeed the value of the membership degree α, whereas if the MSB of the count signal ADD is a 1, the input fuzzy variable $x_{ing}$ is in the non-increasing monotone part of MF and the adder block 4 returns the negated value α' calculated as (ADD−$2^p$+1).

It should be noted that, when the polarity signal POL is 0, for example, thereby indicating that the value α is expected at the output of the calculation circuit 10, this value 0, suitably combined with the MSB of the count signal ADD, is to force the value α at the output OUT, and in a dual fashion, if the polarity signal POL is 1, thereby indicating that the negated value α' is expected at the output of the calculation circuit 10, this value 1, again suitably combined with the MSB of the count signal ADD, is to force the negated value α' at the output OUT.

Advantageously according to the invention, after a careful analysis of hardware reduction, the aforementioned logic combination of signals is simply implemented by means of a XOR gate processing the polarity signal POL and the MSB of the count signal ADD, and by means of the block 6 of (m-1) XOR gates PLm-1, . . . , PL0 with a NOT function or one-bit inverters driven by the polarity flag SP, according to the following operational logic:

1) POL=0 and MSB of POL=0 then,

Output from XOR gate 5=0;

Input to block 6 (as received from adder block 4)=α;

Output OUT from block 6=α as demanded.

2) POL=0 and MSB of POL=1 then,

Output from XOR gate 5=1;

Input to block 6 (as received from adder block 4)=α';

Output OUT from block 6=α' as demanded.

3) POL=1 and MSB of POL=0
then,
Output from XOR gate 5=1;
Input to block 6 (as received from adder block 4)=α;
Output OUT from block 6=α' as demanded.
4) POL=1 and MSB of POL=1
then,
Output from XOR gate 5=0;
Input to block 6 (as received from adder block 4)=α';
Output OUT from block 6=α' as demanded.

It should be noted that the calculating time for the membership degree α; according to the calculation method of the invention is directly proportional to the membership degree α. In particular, the more the bits needed to represent the membership degree α, the more the memory words are needed to store the membership function MF and the longer becomes the time needed to calculate a membership degree corresponding to an input fuzzy variable.

In addition, the calculation method according to the invention can be readily applied to membership functions MF having a number of maximum and minimum values greater than one. It is a matter of splitting into several sections having just one maximum and one minimum, and relating the calculation of the value α to each non-increasing or non-decreasing monotone section.

Finally, it should be noted that the calculation circuit 10 shown schematically in FIG. 3 is but one of the possible hardware circuits that can implement the calculation method according to the invention. For example, by changing the stipulated operation of the end-of-search signal STOP enabling the counter 1, a comparator of the A<B type may be used as the block 3. Likewise, by changing the stipulation for the polarity signal POL acting on the XOR gate 5 and, in cascade, on the block 6, complementary logic blocks may be used or a NOT introduced in the polarity signal POL ahead of the XOR gate 5.

To summarize, the codifying and storing method for according to the invention optimizes, in particular minimizes, the memory area required for storing the membership functions MF, while retaining a large number of function types that can be represented, and the calculation method according to the invention is effective to minimize the hardware needed to calculate the membership degree α corresponding to a given fuzzy variable x.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. A codifying and storing method for membership functions representing a membership degree of fuzzy variables defined within a universe of discourse which is discretized into a finite number of points, implemented by a calculation circuit of a memory device, the method comprising: quantizing said membership functions into a finite number of levels corresponding to a finite number of membership degrees, and storing in said memory device the quantized membership functions according to a characteristic value of each sub-set of values of fuzzy variables which have for their image the same value of said membership degree corresponding to one of said levels, the characteristic values being stored in a table of said memory device.

2. The codifying and storing method of claim 1 wherein said characteristic value is a maximum value of said sub-sets.

3. The codifying and storing method of claim 2, comprising having a last characteristic value ($x_{2k}$) coincident with the maximum value of the universe of discourse.

4. The codifying and storing method of claim 1 wherein said characteristic value is a minimum value of said sub-sets.

5. The codifying and storing method of claim 4, comprising having a first characteristic value ($x_0$) coincident with the minimum value of the universe of discourse.

6. The codifying and storing method of claim 1 wherein said characteristic values of a membership function are stored in the table of the memory device whose address indicates the membership degree, said characteristic values being stored in said table for each address.

7. The codifying and storing method according to claim 6, wherein the value of the membership degree (α) of the membership functions can be obtained by said calculation circuit, starting from said table address (ADD), according to the following relation:

α=ADD if ADD≦2$p$−1, and

α=ADD−2$p$+1 if ADD>2$p$−1 where, p is the number of bits for representing the membership degree (α).

8. The codifying and storing method of claim 1, wherein said table has (2k+1) rows each of n bits, where n is the number of bits which represent the universe of discourse, and k=$2^p$−1, where p is the number of bits for representing a membership degree.

9. A method for calculating the value of the membership degree of a fuzzy variable defined within a universe of discourse discretized into a finite number of points with reference to a membership function thereof, implemented by a calculation circuit of a memory device, the method comprising quantizing said membership function into a finite number of levels corresponding to a finite number of membership degrees, and storing in said memory device the quantized membership function according to a characteristic value of each sub-set of values of fuzzy variables having for their image the same value of said membership degree corresponding to one of said levels, the characteristic values being stored in a table of said memo device, and reading sequentially from said memory containing data about said membership function until a value contained in said memory is met that corresponds to the first value equal to or greater than the value of an input fuzzy variable, the location of said value in the memory corresponding to the value of the membership degree sought.

10. The calculation method of claim 9 wherein a polarity signal is provided to enable calculation of said membership degree or of a negated value of said membership degree according to the following scheme:

when the polarity signal is nil, calculate the value of the membership degree;

when the polarity signal is a 1, calculate the value of the negated value of the membership degree.

11. A circuit for calculating the membership degree of a fuzzy variable within a universe of discourse that is discretized into a finite number of points with reference to a membership function thereof, comprising:

a counter supplying a count signal;

a table of a memory containing characteristic values of each sub-set of values of fuzzy variables having for their image the same value of said membership degree, and being connected to an input of said counter;

a comparator connected to an input of said counter and connected to said table, said comparator supplying an end-of-search signal to said counter;

an adder block connected to an input of said counter to receive said count signal, and supplying a result; and a calculation block connected to an input of said adder block and supplying at an output a value of said membership degree or a negated value of said membership degree according to a polarity signal input to said calculation block.

12. The calculation circuit of claim 11, further comprising a logic gate having a first input that receives the m-th bit of said count signal corresponding to the most significant bit (MSB) of said polarity signal (POL), and a second input receiving said polarity signal (POL), as well as an output supplying a polarity flag (SP) and which is connected to said calculation block.

13. The calculation circuit of claim 12 wherein said calculation block has a plurality of logic gates receiving as input said polarity flag.

14. The calculation circuit of claim 13 wherein said logic gates are XOR gates.

15. The calculation circuit of claim 11 wherein said logic gate is a XOR gate.

16. The calculation circuit of claim 11 wherein said comparator is configured to receive as input an input fuzzy variable and a value contained in said table at a row having an address that is the same as the count signal, and outputs the end-of-search signal when the value of said input fuzzy variable exceeds the value contained in the table.

17. The calculation circuit of claim 11 wherein said adder block has a first input terminal receiving the m-th bit of the count signal, and a second input receiving the remaining m−1 bits of the count signal.

18. The calculation circuit of claim 17 wherein said adder block adds together the bits received at the inputs to directly output the value of the membership degree when the most significant bit of the polarity signal is 0, and to output the negated value of the membership degree when the most significant bit of the polarity signal is 1.

19. The calculation circuit of claim 11 wherein said counter receives as input, in addition to said end-of-search signal, a clock signal, and a reset signal.

20. A method for codifying and storing membership functions representing a membership degree of fuzzy variables defined within a universe of discourse that is discretized into a finite number of points, implemented by a calculation circuit of a memory device, the method comprising:

quantizing membership functions into a finite number of levels corresponding to a finite number of membership degrees; and storing in said memory device the quantized membership functions according to a characteristic value of a subset of values of fuzzy variables that have for an image a same value of the membership degree corresponding to one of the levels, the characteristic values of the membership functions are stored in a table of said memory device with addresses indicating the membership degree, with the characteristic values stored in the table for each address.

21. A method for codifying and storing membership functions representing a membership degree of fuzzy variables defined within a universe of discourse that is discretized into a finite number of points, implemented by a calculation circuit of a memory device, the method comprising:

quantizing membership functions into a finite number of levels corresponding to a finite number of membership degrees; and storing in said memory device the quantized membership functions according to a characteristic value of a subset of values of fuzzy variables that have for an image a same value of the membership degree corresponding to one of the levels, the characteristic values of the membership functions are stored in a table of said memory device with addresses indicating the membership degree, with the characteristic values stored in the table for each address, the value of the membership degree ($\alpha$) of the membership functions are obtained by said calculation circuit, starting from said table address (ADD), according to the following relation:

$\alpha = $ADD when ADD$\leq 2^p - 1$, and $\alpha = $ADD$- 2^p + 1$ when ADD$> 2^p - 1$ where p is the number of bits for representing the membership degree ($\alpha$).

22. A method for codifying and storing membership functions representing a membership degree of fuzzy variables defined within a universe of discourse that is discretized into a finite number of points, implemented by a calculation circuit of a memory device, the method comprising:

quantizing membership functions into a finite number of levels corresponding to a finite number of membership degrees;

storing in said memory device the quantized membership functions according to a characteristic value of a subset of values of fuzzy variables that have for an image a same value of the membership degree corresponding to one of the levels, the characteristic values of the membership functions are stored in a table of said memory device with addresses indicating the membership degree, with the characteristic values stored in the table for each address, the value of the membership degree ($\alpha$) of the membership functions can be obtained, by said calculation circuit, starting from said table address (ADD), according to the following relation:

$\alpha$ADD when ADD$\leq 2^p - 1$, and $\alpha = $ADD$- 2^p + 1$ when ADD$> 2^p - 1$ where p is the number of bits for representing the membership degree ($\alpha$); and providing a polarity signal to enable calculation of the membership degree or of a negated value of the membership degree according to the following scheme:

when the polarity signal is nil, calculate the value of the membership degree;

when the polarity signal is a 1, calculate the value of the negated value of the membership degree.

* * * * *

UNITED STATES PATENT AND TRADEMARK OFFICE
CERTIFICATE OF CORRECTION

PATENT NO. : 6,842,744 B2  Page 1 of 1
APPLICATION NO. : 09/969519
DATED : January 11, 2005
INVENTOR(S) : Franceso Pappalardo et al.

It is certified that error appears in the above-identified patent and that said Letters Patent is hereby corrected as shown below:

Column 10,
Claim 9, Line 41, "said memo device," should read as --said memory device,--.

Signed and Sealed this

Eighth Day of January, 2008

JON W. DUDAS
*Director of the United States Patent and Trademark Office*